(12) United States Patent  
Wu et al.

(10) Patent No.: US 6,966,698 B2  
(45) Date of Patent: Nov. 22, 2005

(54) CLIP-CHAIN MODULE OF ROLLING UNIT

(75) Inventors: Chun-Liang Wu, Taichung (TW); Chin-Pei Wang, Taichung (TW)

(73) Assignee: Hiwin Technologies, Taichung (TW)

( * ) Notice: Subject to any disclaimer, the term of this patent is extended or adjusted under 35 U.S.C. 154(b) by 189 days.

(21) Appl. No.: 10/639,192

(22) Filed: Aug. 11, 2003

(65) Prior Publication Data

US 2005/0036721 A1 Feb. 17, 2005

(51) Int. Cl.[7] ............................................. F16C 29/04
(52) U.S. Cl. ........................................ 384/49; 384/51
(58) Field of Search ............................. 384/49, 51, 44, 384/43, 45

(56) References Cited

U.S. PATENT DOCUMENTS 6,082,210 A * 7/2000 Ise ................................. 384/51
6,668,673 B2 * 12/2003 Hsu ............................. 384/49

* cited by examiner

*Primary Examiner*—Lenard A. Footland
(74) *Attorney, Agent, or Firm*—Charles E. Balxey

(57) ABSTRACT

The present invention relates to a clip-chain module of rolling unit, which structure had the spacers, the end-part and the link-belt. The characteristic of the clip-chain module of rolling unit was made up of one or upward half clip-chains, thereby can reduce the friction of the rolling element and improve the difficulty of the process. Therefore, this invention can enhance the competitiveness of this product.

9 Claims, 9 Drawing Sheets

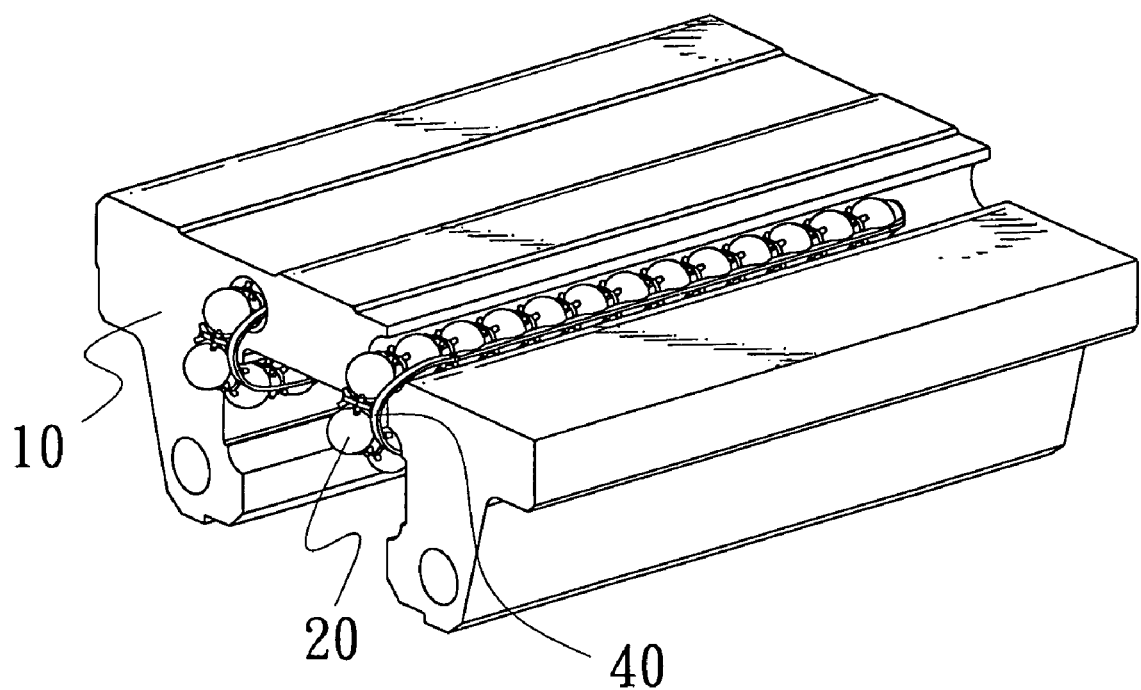
F I G. 1

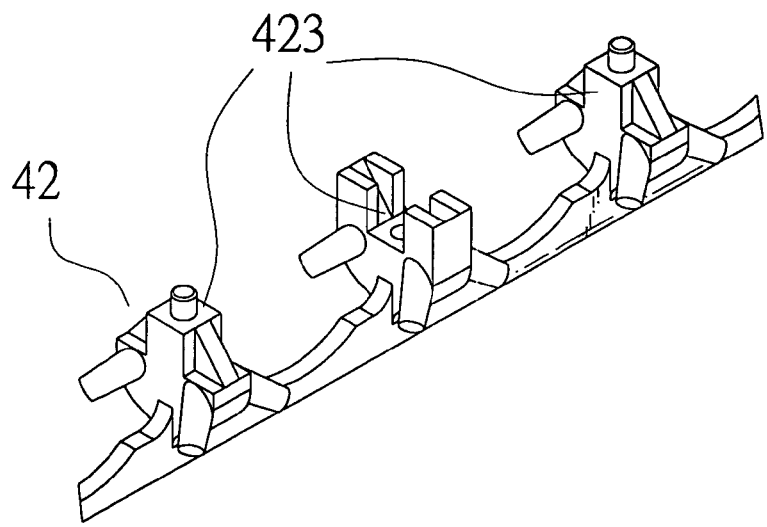
F I G. 4
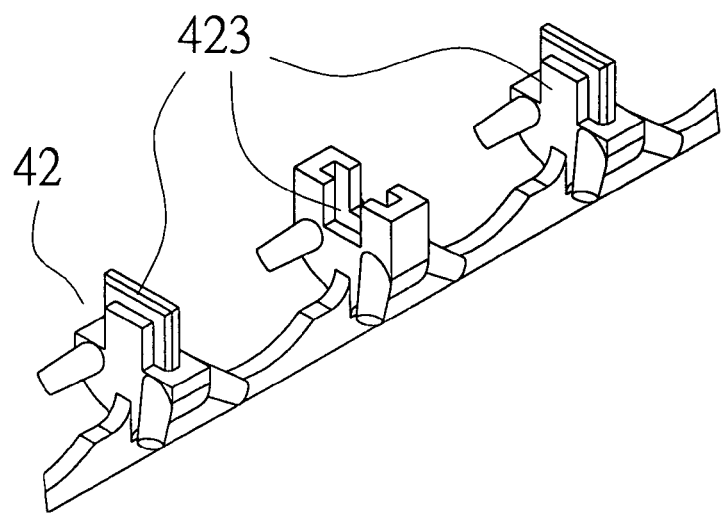
F I G. 5

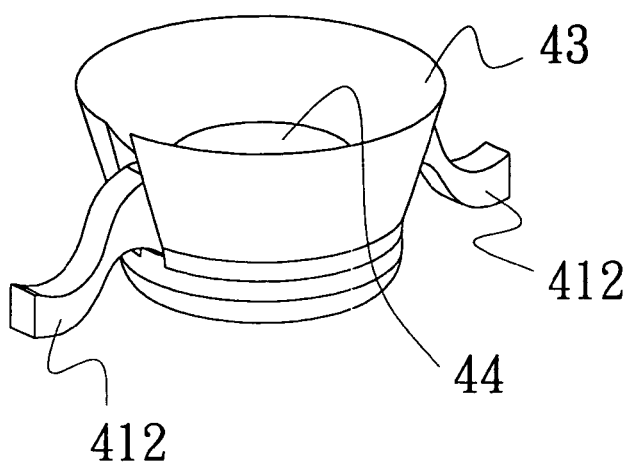
F I G. 7
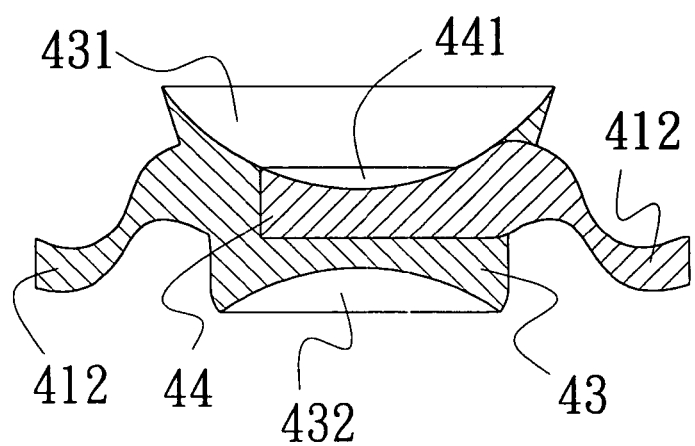
F I G. 8

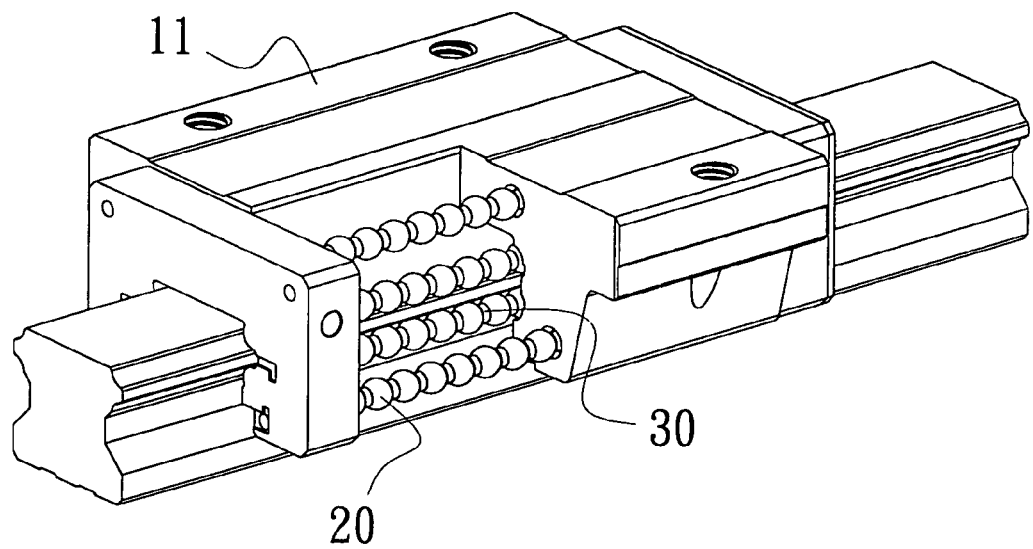
F I G. 11
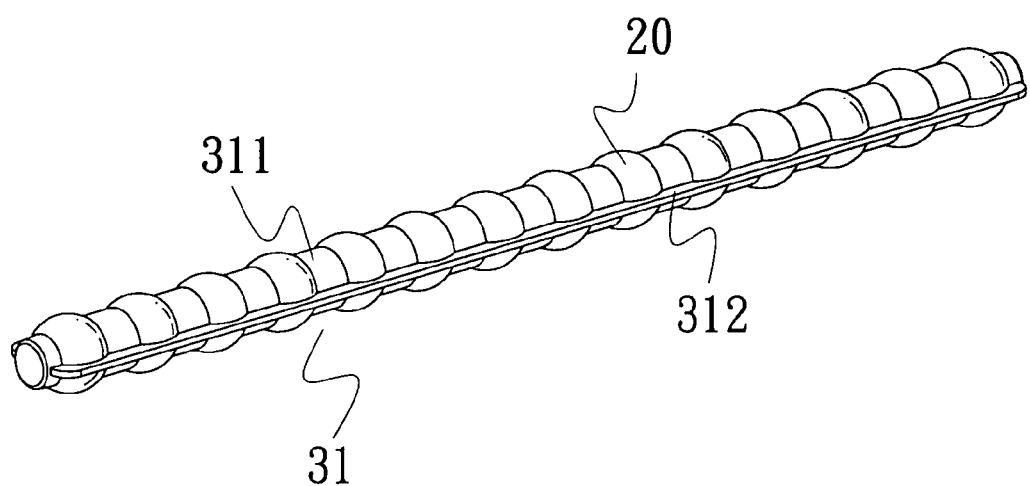
F I G. 12

CLIP-CHAIN MODULE OF ROLLING UNIT

BACKGROUND OF THE INVENTION

1. Field of the Invention

The present invention relates to a clip-chain module of rolling unit, and more particularly to a receiving device for receiving rolling elements, which is applied to rolling units such as linear guide way, ball screw and linear rolling bearing. Normally the rolling unit is applied to mechanical, electronic, automatic equipment, semi-conduct device and the likes.

2. Description of the Prior Arts

The receiving device for receiving rolling elements of prior arts generally can be divided into two categories: first one is an independent individual receiver, and another one is a receiver made up of plural independent individuals. As shown in FIG. 11, wherein the slide block 11 is mounted onto a rail and slides thereon, which is interiorly provided with a plurality of rolling elements 20 and between every two neighboring rolling elements 20 is provided with a single receiver 30 so as to prevent the rolling elements 20 from striking with each other. It is time-consuming to assemble this rolling unit by alternatively inserting the rolling element and single receiver in the slide block, furthermore, the receivers and the rolling elements are coupled with each other closely, such will cause interference in the rolling of the rolling element.

With reference to FIG. 12, which shows a receiver made up of plural independent individuals, wherein the receiver 31 is made up of plural independent spacers 311 linked together by a flexible chain 312, so as to confine the respective rolling elements 20 in the intervals between paired neighboring spacers 311. The method of making this kind of receiver 31 is by putting the rolling elements in a mould and made by plastic ejection moulding, the material and the ejection moulding machine should be high quality, thus the production cost is relatively increased. Furthermore, due to the special manufacturing method, the receivers and the rolling elements are coupled with each other closely, such will interfere in the rolling of the rolling element.

The present invention has arisen to mitigate and/or obviate the afore-described disadvantages of the conventional chip-chain module of rolling unit.

SUMMARY OF THE INVENTION

In accordance with one aspect of the present invention is to provide a clip-chain module of rolling unit, which includes the spacer, the end-part and the link-belt. The characteristic of the clip-chain module of rolling unit was made up of one or upward half clip-chains thereby can reduce the friction of the rolling element and improve the difficulty of the process. Therefore, this invention can enhance the competitiveness of this product.

The present invention will become more obvious from the following description when taken in connection with the accompanying drawings, which shows, for purpose of illustrations only, the preferred embodiments in accordance with the present invention.

BRIEF DESCRIPTION OF THE DRAWINGS

FIG. 1 is an illustrative view of showing a clip-chain module of rolling unit of the present invention works with a sliding block;

FIG. 4 is a partial amplified view of a second embodiment of the half clip-chain of FIG. 2;

FIG. 5 is a partial amplified view of a third embodiment of the half clip-chain of FIG. 2.

FIG. 7 is a perspective view of the end-part of the clip-chain module of rolling unit;

FIG. 8 is a cross-sectional view of the end-part of the clip-chain module of rolling unit;

FIG. 11 is a perspective view of a receiver of single individual type of prior arts;

FIG. 12 is a perspective view of a receiver of prior arts made up of multiple-individuals.

DETAILED DESCRIPTION OF THE PREFERRED EMBODIMENTS

Referring to FIG. 1, which shows a clip-chain module of rolling unit of the present invention working with a sliding block, wherein rolling elements 20 are balls. The each rolling element 20 in the slide block 10 is positioned therein by virtue of a clip-chain module of rolling unit 40, so as to maintain the respective rolling element 20 stay in a good order and enable them to roll in the slide block 10 in endless circles.

Figure 2:
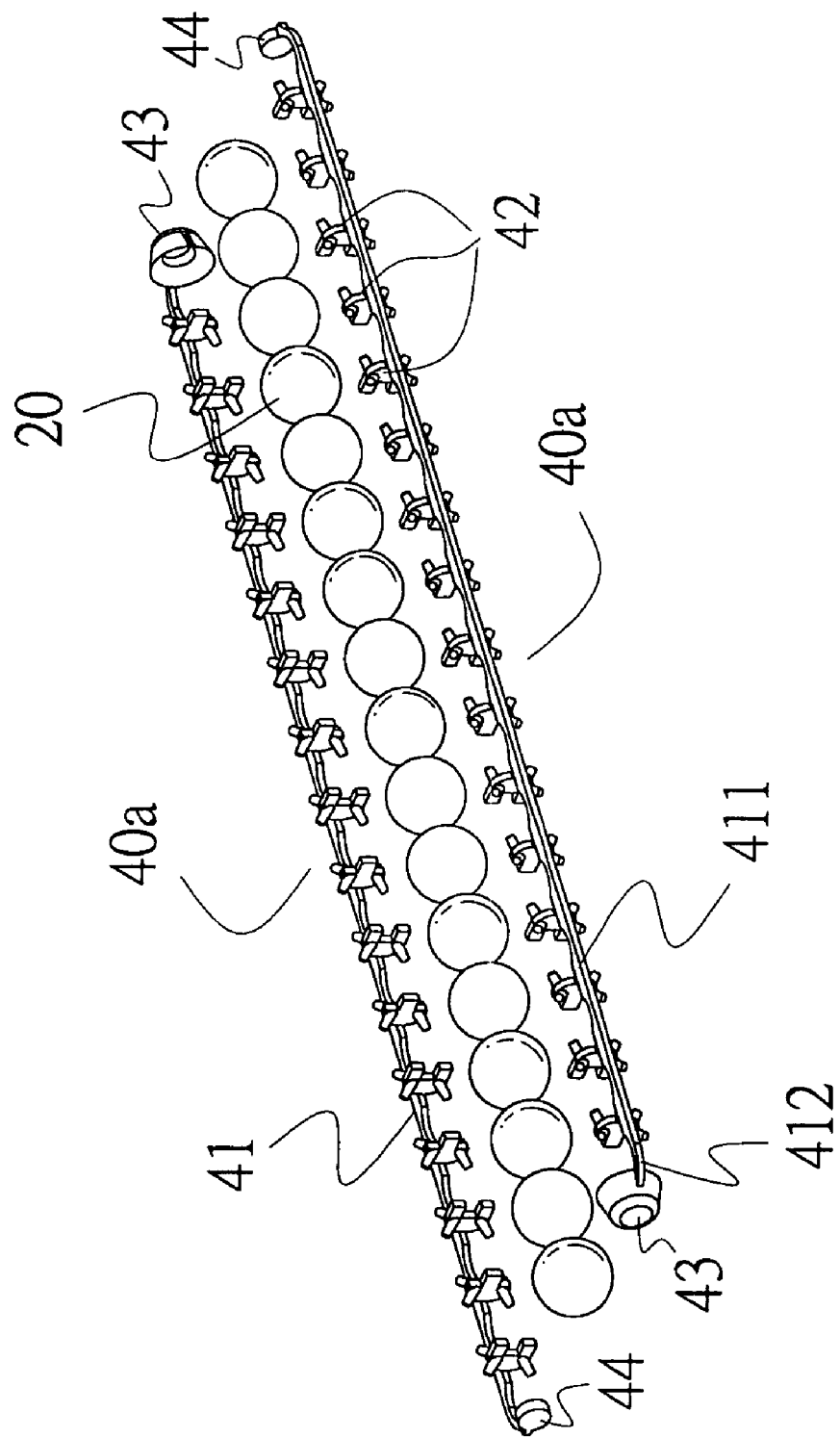
FIG. 2 is an exploded view of a first embodiment of the clip-chain module of rolling unit of FIG. 1.

FIG. 2 is an exploded view of a first embodiment of the clip-chain module of rolling unit of FIG. 1, it is learned from the drawing that the clip-chain module of rolling unit is made up of plural clip-chains, namely, a plurality of combinations of two half clip-chains 40a. Each of the half clip-chains 40a is made up of a link-belt 41, spacers 42 and end-parts 43, 44. The spacers 42 are connected together with the end-parts 43, 44 by virtue of receiving link-belt 411 together with end link-belt 412 of the link-belt 41. Wherein the spacers 42 serve to space out and receive the rolling elements 20, each paired neighboring spacers 42 define an interval for accommodation of a rolling element 20 and permitting it to roll therein.

Figure 3:
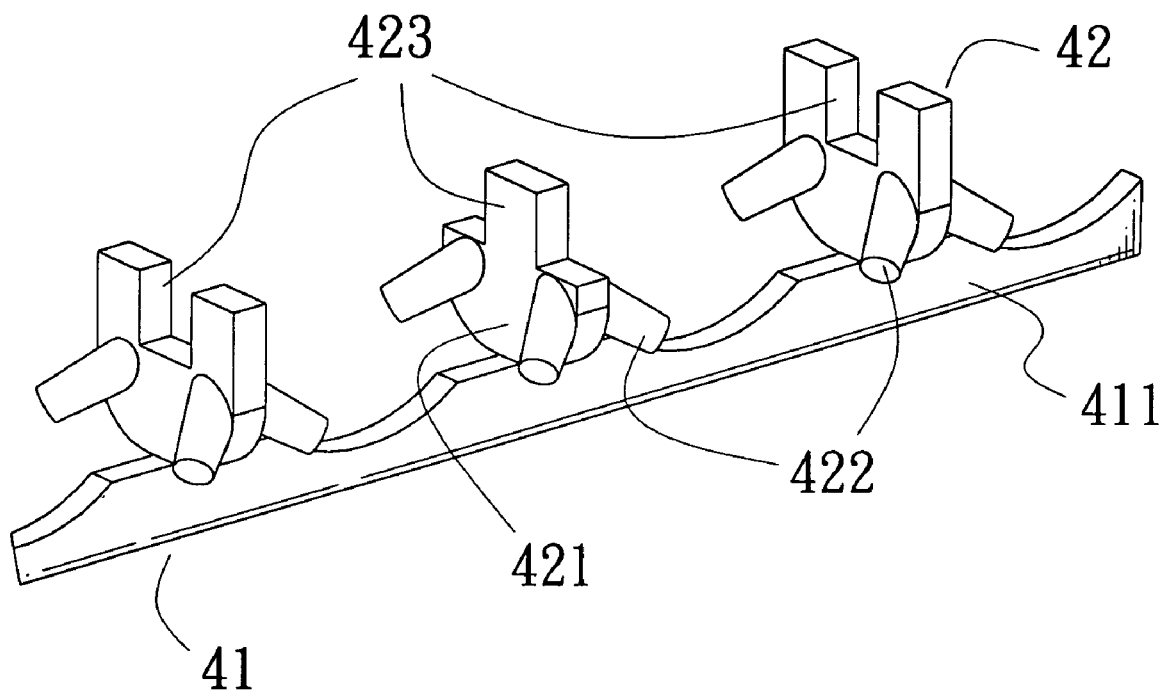
FIG. 3 is a partial amplified view of the half clip-chain of FIG. 2.

FIG. 3 is a partial amplified view of the half clip-chain of FIG. 2. It is learned from the drawing that each spacer 42 includes a base portion 421, a supporting portion 422 and an engaging portion 423. The engaging portions 423 of the spacers 42 are configured by manner of matching-pair, so as to increase the engaging area after the two half clip-chains are engaged together, thus the spacers 42 between the half clip-chains can be engaged together tightly and properly. The each supporting portion 422 extends out from the base portion 421 at a specific angle, so as to receive the rolling element by manner of point-contact. The base portion 421 of each spacer 42 is integrally linked with the receiving link-belt 411 of the link-belt 41, such that the plural spacers 42 are connected together in chain by virtue of the receiving link-belt 411, by this way, the rolling elements can be received in interval of each two relative movable spacers 42. Furthermore, the inner periphery of the receiving link-belt 411 between each paired neighboring spacers 42 is configured for matching with the external shape of the rolling element, so as to free the rolling of the rolling element from interference.

FIG. 4 is a partial amplified view of a second embodiment of the half clip-belt of FIG. 2. Wherein on the engaging portion 423 of each spacer 42 is additionally provided with a fixing device, particularly on the top portion of engaging portion 423 is provided with a pin structure formed by manner of matching-pair. Furthermore, at both sides of the engaging portions 423 a rib structure is defined respectively by manner of matching-pair, such that prevent the disengagement of the spacers caused by angular torsion.

FIG. 5 is a partial amplified view of a third embodiment of the half clip-chain of FIG. 2, wherein the additional fixing devices on the engaging portions 423 of the spacers 42 are configured in the shape of a spline and formed by like manner of matching-pair, such that prevents the disengagement of the spacers caused by angular torsion.

Figure 6:
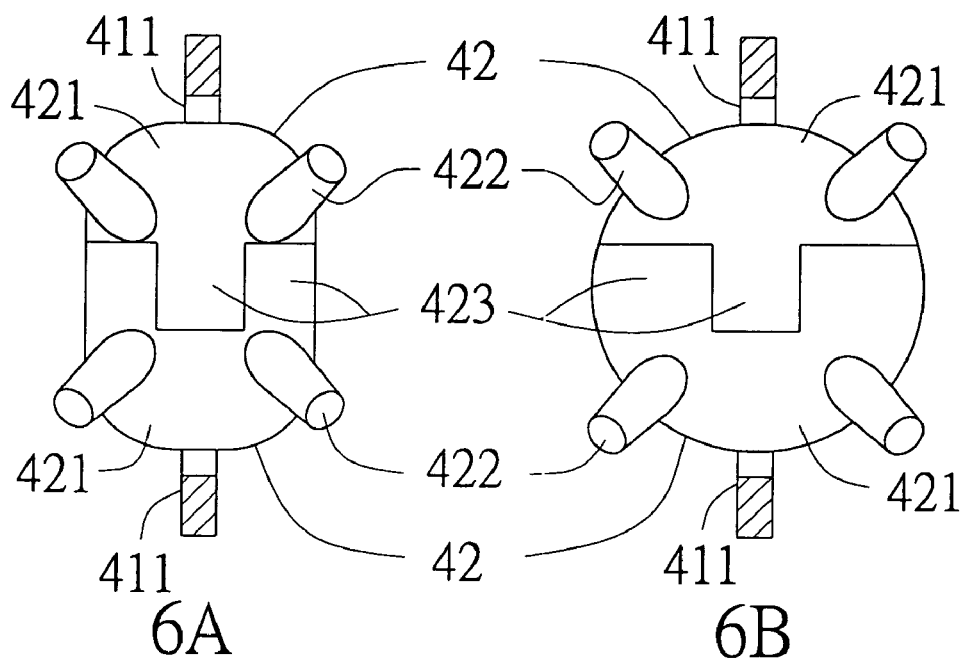
FIG. 6 is a cross sectional assembly view of the spacer of the clip-chain module of rolling unit in accordance with the present invention.
Figure 6:
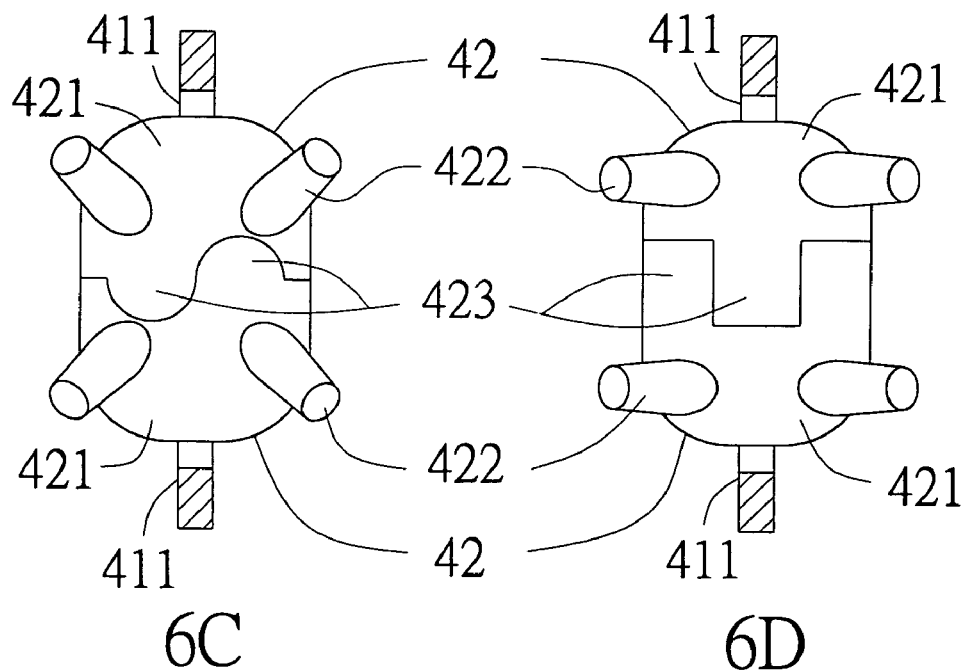

FIG. 6 is a cross sectional assembly view of the spacer of the clip-chain module of rolling unit in accordance with the present invention. Wherein each spacer 42 of the half clip-chain has an engaging portion 423 for serving to integrally combine two half spacers 42 together so as to form a complete spacer. The shape and dimension of the base portion 421 of each spacer 42 are decided by the configuration of the corresponding supporting portion 422 as well as the turning curvature of the rolling elements rolling in the slide block. As shown in FIG. 6A the combination of the spacer is strip-shaped, the engaging portions 423 are engaged together by an out-and-in manner, the supporting portions 422 radially extend out. The diversity of FIG. 6B is that the combination of the spacers is round-shaped. The engaging portions 423 of FIG. 6C is characterized as having double convex-concave structure, while the feature of FIG. 6D is that the supporting portions 422 extend outward with perpendicular to the receiving link-belt 411.

FIG. 7 is a perspective view of the end-part of the clip-chain module of rolling unit. FIG. 8 is a cross-sectional view of the end-part of the clip-chain module of rolling unit. The half clip-chains of the present invention each has a first and a second end part 43, 44, both of which are connected by end link-belt 412, as shown in FIG. 7, the end link-belt 412 is flexure-formed so as to has a better flexibility. Moreover, the end parts of the clip-chain module of rolling unit of the present invention have an ability of engaging with each other and capable of receiving the respective rolling element. As shown in FIG. 8, wherein at the inner periphery of the end part 43 a bearing portion 431 is formed with corresponding to the shape of the rolling elements for purpose of embracing the endmost rolling element. And alike, at the outer periphery of the end part 43 a connecting portion 432 is defined and shaped for matching with the rolling elements, such that enables the clip-chain module of rolling unit to externally couple a rolling element with its end. In addition, the end parts 43, 44 are combined together by inserting end part 44 in end part 43. The end part 44 is alike defined with a bearing portion 441 for matching with that bearing portion 431 of the end part 43, such that the end parts 43, 44 can be engaged well with each other.

Figure 9:
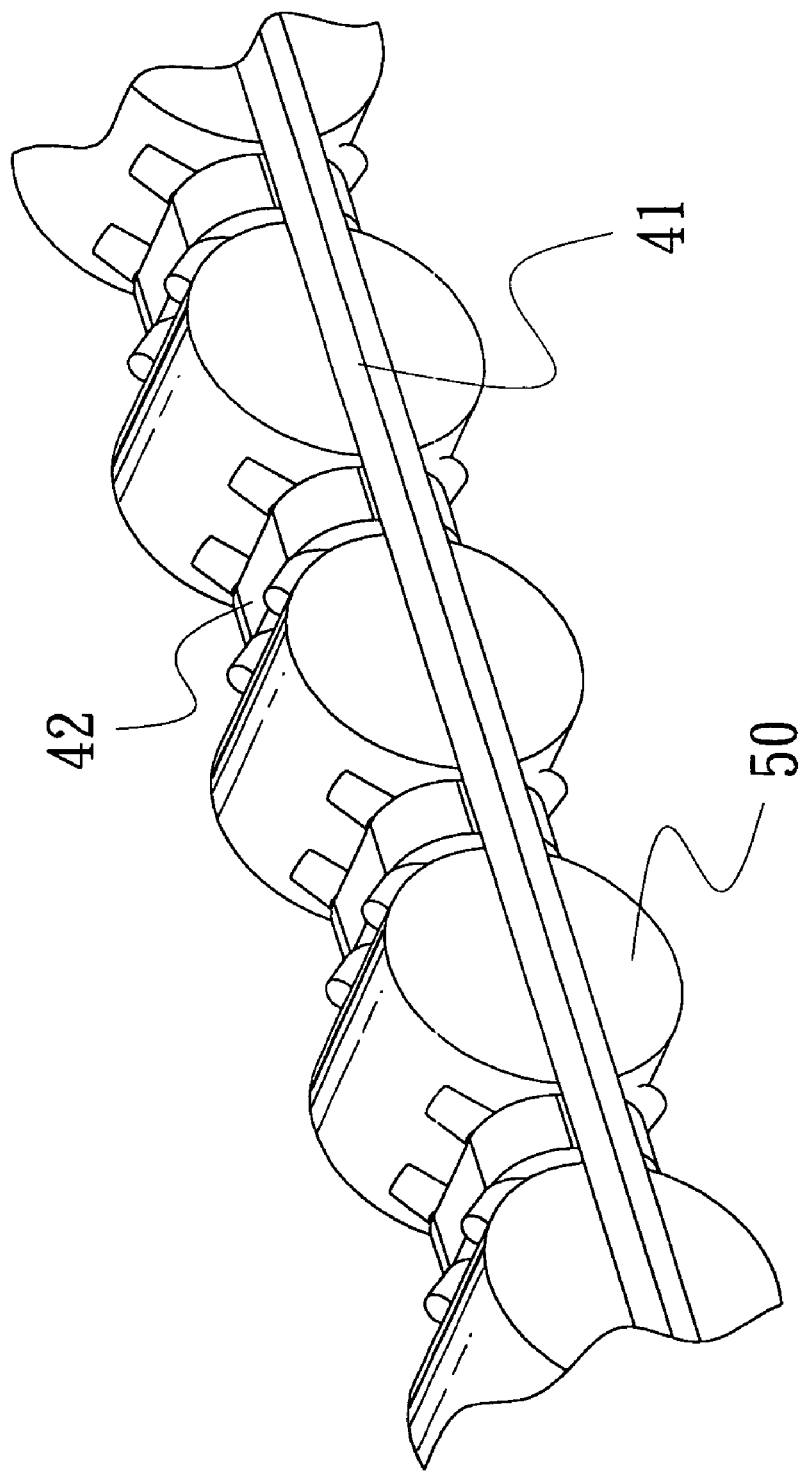
FIG. 9 shows another type clip-chain module of rolling unit of the present invention.

Referring to FIG. 9, which shows another type clip-chain module of rolling unit of the present invention. Wherein the rolling elements 50 are rollers, the clip-chain module of rolling unit is a combination of half clip-chains, and identically, the spacers 42 serve to space out and receive the respective rolling elements 50, each two neighboring spacers 42 define an interval therebetween for accommodation of a rolling element 50.

Figure 10:
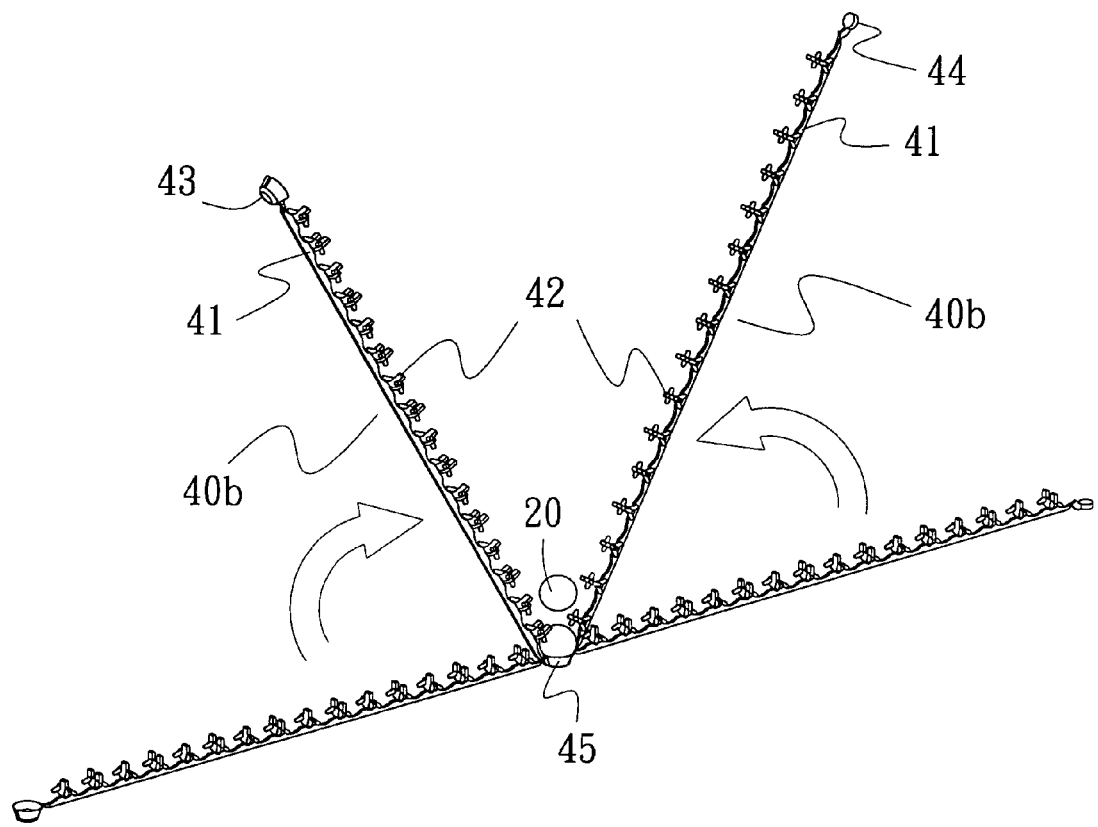
FIG. 10 is an illustrative view of showing a second embodiment of a clip-chain module of rolling unit of FIG. 1.

FIG. 10 is an illustrative view of showing a second embodiment of a clip-chain module of rolling unit of FIG. 1. Wherein the half clip-chains 40b each has a first and a second end part 43, 44, the first and second end parts 43, 44 and the plural spacers 42 are connected together, and particularly a central end part 45 is formed in the middle of the half clip-chains 40b, the spacers 42 at both sides of the central end part 45 are balanced in quantity. In assembling, by inserting a rolling element 20 initially in the central end part 45, and then folding the both sides of the central end part 45 upward, whenever a spacer 42 is integrated then sequentially insert a rolling element 20 therein, such that forms a complete clip-chain module of rolling unit.

While we have shown and described various embodiments in accordance with the present invention, it should be clear to those skilled is in the art that further embodiments may be made without departing from the scope of the present invention.

What is claimed is:

1. A clip-chain module of rolling unit for sequentially spacing a plurality of rolling elements and generally comprising:
   plural spacers for spacing out the rolling elements, every paired neighboring spacers defining an interval therebetween for accommodation of a rolling element respectively as well as permitting for rolling of the same therein;
   end parts defined at both sides of the clip-chain module of rolling unit for confining the rolling elements in the clip-chain module of rolling unit;
   a link-belt for connecting the end-parts and spacers together;
   the above-mentioned clip-chain module is a combination of half clip-chains, the half clip-chains each having the spacers, end parts and link-belt.

2. The clip-chain module of rolling unit as claimed in claim 1, wherein the spacers of the half clip-chains each have an engaging portion for enabling the respective spacers to engage with each other.

3. The clip-chain module of rolling unit as claimed in claim 2, wherein the each engaging portion of the spacers is additionally provided with a fixing device, which configured in the form of pins, rib or splines, whereby to prevent the disengagement of the half spacers from each other.

4. The clip-chain module of rolling unit as claimed in claim 1, wherein the spacer of each half clip-chain is provided with a supporting portion which extending outward with a specific angle, so as to receive the rolling element by manner of point-contact.

5. The clip-chain module of rolling unit as claimed in claim 1, wherein the intervals between each paired neighboring spacer are configured for matching with the shape of the rolling elements so as to free the rolling elements from interference, the link-belt for connecting the end parts are flexure-formed whereby to have a better flexibility.

6. The clip-chain module of rolling unit as claimed in claim 1, wherein the end parts can be coupled with each other, such that two or upward half clip-chains can be combined together so as to form a complete clip-chain module of rolling unit with desired length.

7. The clip-chain module of rolling unit as claimed in claim 1, wherein a central end part is formed in the middle of the half clip-chains, the spacers at both sides of the central end part are balanced in quantity, the end parts at both ends of the half clip-chains can be coupled with each other, whereby two or upward half clip-chains can be combined together so as to form a complete clip-chain module of rolling unit.

8. The clip-chain module of rolling unit as claimed in claim 1, wherein the rolling elements are balls.

9. The clip-chain module of rolling unit as claimed in claim 1, wherein the rolling elements are rollers.

* * * * *